Patented Aug. 21, 1923.

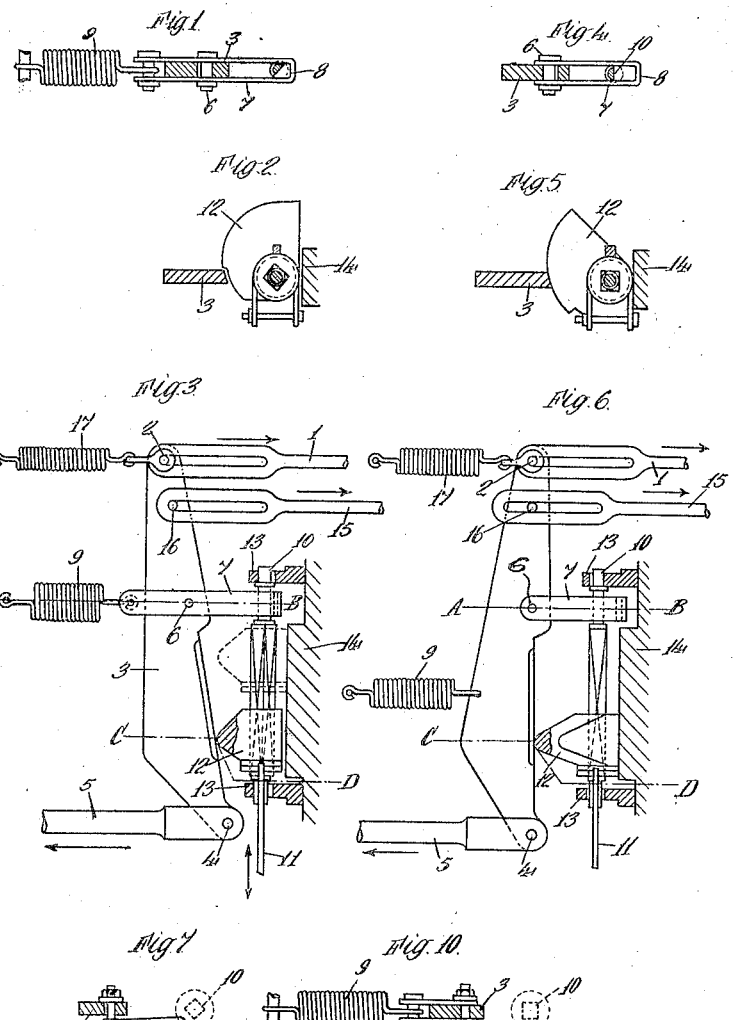

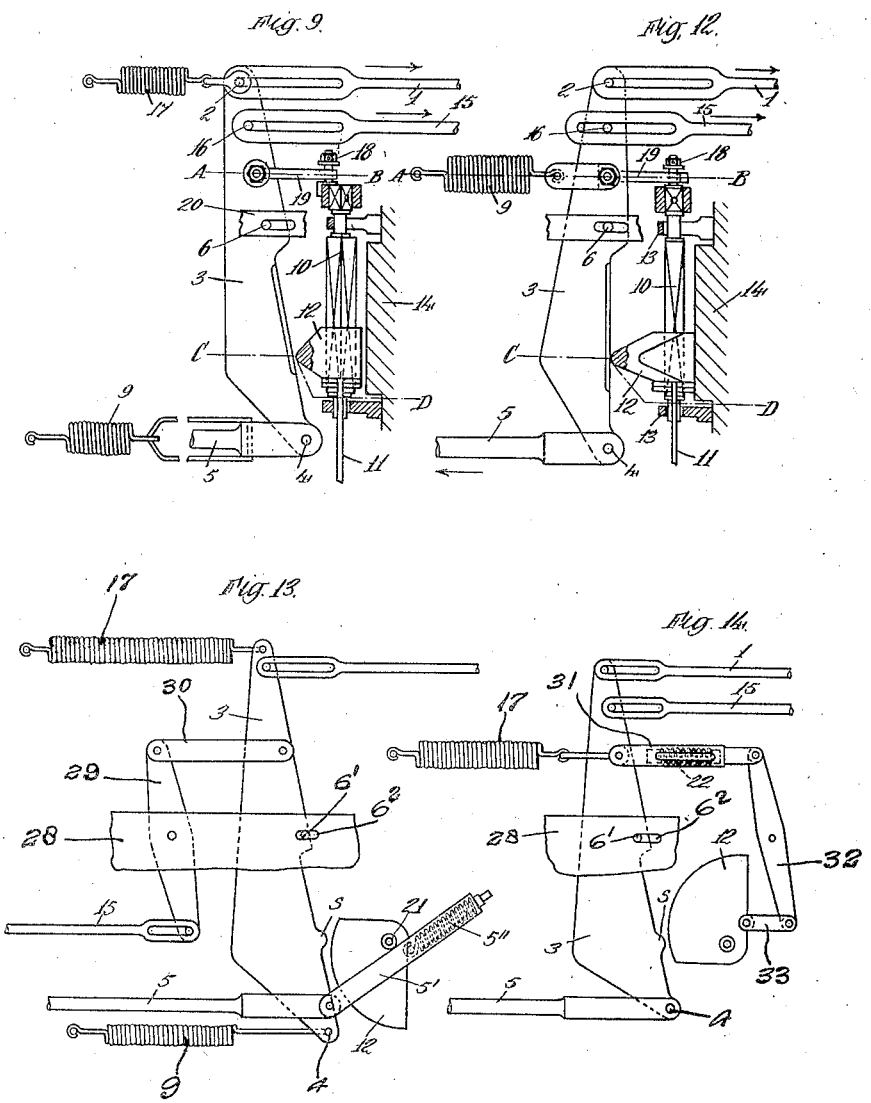

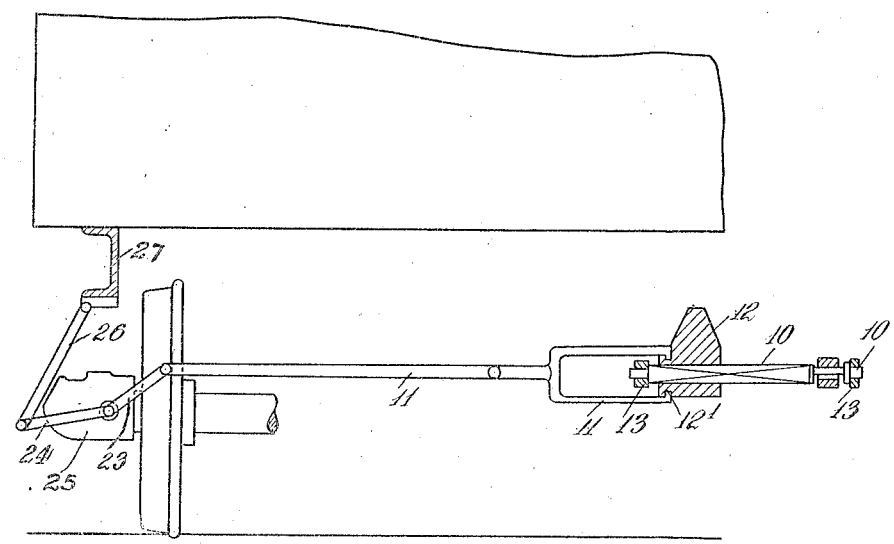

1,465,487

UNITED STATES PATENT OFFICE.

ALFRED SCHEUER, OF VIENNA, AND HUGO SCHEUER, OF RETZ, AUSTRIA, ASSIGNORS TO HANDEL MAATSCHAPPIJ H. ALBERT DE BARY & COY, OF AMSTERDAM, HOLLAND, A DUTCH COMPANY.

BRAKING APPARATUS.

Application filed August 27, 1921. Serial No. 495,911.

*To all whom it may concern:*

Be it known that we, ALFRED SCHEUER and HUGO SCHEUER, both Austrian citizens, residing, respectively, at 12 Nordbahnstrasse, Vienna, Austria, and 107 Vinvenciplatz, Retz, Austria, have invented certain new and useful Improvements in Braking Apparatus, of which the following is a specification.

This invention relates to brakes for vehicles particularly the compressed air or vacuum brakes of railway or similar vehicles.

It is an object of the invention to provide improved means whereby while the brake blocks are initially applied to the wheels rapidly the effective braking power is transmitted only after the brake blocks have thus been initially applied to the wheels, and further to provide means for ensuring the return of the brake rod to its initial position when the brake is released.

In accordance with the invention we provide a single brake lever adapted first to be moved about one pivotal point to apply the brake blocks to the wheels and then to be moved about another pivotal point against the resistance of spring or similar means to transmit the braking power, the fulcrum for the second pivotal movement being constituted by an eccentric or the like device adapted to be brought into operative position by the initial movement of the brake lever.

In order that the invention may be clearly understood and readily carried into effect, we will now proceed to describe the same more fully with reference to the accompanying drawings in which:—

Figures 1 and 2 are details and Figure 3 a view partly in section of one constructional form of the invention, Figures 1 and 2 being transverse sections respectively taken on the lines A—B and C—D of Figure 3.

Figures 4, 5 and 6 are similar views of another constructional form.

Figures 7, 8 and 9 are similar views of a further constructional form.

Figures 10, 11 and 12 are similar views of a still further constructional form.

Figure 13 illustrates one modification and

Figure 14 is a further modification intended to obviate the liability of jamming and consequently the non-removal of the brake blocks from the wheels.

Fig. 15 illustrates part of a vehicle with a portion of the braking apparatus shown thereon.

In Figures 1 to 3 which show one constructional form the parts are illustrated in the positions they assume when the brake is in "off" or released position. On applying the brake the power or force of the brake piston acts, by means of the slotted brake piston rod —1— and of the bolt —2—, upon the brake lever —3— which is maintained in a horizontal position by means which have been specially shown in the drawings, and is in any case secured against lateral displacements. The brake pressure rod —5—, leading to the brake blocks, is attached to the brake lever —3— by means of bolts —4—. By means of a bolt —6— there is attached to the brake lever —3— a stirrup or arch —7— bent into the shape of a U, in the curve or bend of which there is firmly fixed a wedge-shaped stop-block —8— (see Figure 1). The yoke or stirrup —7— is subjected to the continuous pull of a spiral spring —9— so that, when the brake is released, the stop-block —8— is pressed against a wedge-surface forming part of a wedge-shaped notch in the shaft —10— corresponding to its bevelling so that, when the brake is released, it is continuously maintained in a definite position which corresponds to that shown in Figure 3. Upon a square portion of the shaft —10— an eccentric —12— is mounted which, by means of the thrust rod —11— connected to it, can be displaced longitudinally on the squared portion of the shaft —10—. The shaft —10— is not rigidly mounted in the bearings —13—, but is capable of a slight horizontal movement transversely to its longitudinal axis, so that the movable eccentric —12— mounted thereon either stands away a little from the supporting plate or member —14—, or bears upon said plate —14—. The hand brake is also connected to the brake lever —3— by means of the pull rod —15—, also provided with a slot, and of the bolt —16—. The spiral spring —17— draws the brake upon release back into its normal position.

One means for displacing the eccentric 12 longitudinally of the shaft 10 is illustrated in Figure 15. In this figure the thrust rod 11 is shown formed with a bifurcated end which engages with an annular recess 12' in the eccentric 12 and serves to impart longitudinal movement to the eccentric and permits relative rotary movement thereof when operated by the differences of weight of the vehicle, such operation being effected through the medium of a link 23 connecting the thrust rod 11 with one end of a lever 24 pivotally mounted on an axle box 25 of the vehicle and connected at its other end by a link 26 to the framing 27 of the vehicle. By such an arrangement the movement of the vehicle relatively to the axle box due to different loads is transmitted to the eccentric 12 and its position is accordingly regulated.

The method of operation of this arrangement is as follows:—

If the upper end of the rod —1— be moved to the right by the brake piston (Figure 3) then the brake lever —3—, whilst stretching the spring —17— and overcoming frictional resistance, is first of all turned around the bolt —6— which for the time being is not able to change its position as the spring —9—, which must of course possess a corresponding initial tension will prevent it from doing so. The brake blocks are, consequently, rapidly pressed upon the tires of the wheels, the velocity corresponding to the ratio of transmission of the lever —3—, as determined by the position of the bolt —6—. Upon the brake blocks being firmly applied to the wheels the pressure rod —5— experiences no further movement, and the brake lever —3— will now, as the piston in the brake cylinder still continues to act, move about the bolt 4 and stress the spring —9—. By such movement of the lever 3 about the bolt 4, the yoke or stirrup 7 is moved to the right, and moves the stop-block —8— out of the wedge-shaped notch in the shaft 10 which is thereupon released for rotation by the weight of the eccentric —12—, such rotation continuing until the distance between the eccentric —12— and lever —3— which has become larger during the brake block applying movement of the rod —5—, has been filled up by the eccentric, that is to say until the eccentric —12— bears against the lever —3—. Owing to the movable journalling of the shaft —10— in the bearings 13 to permit it to move transversely thereof the eccentric —12— is now pressed by the lever —3— against the rigid supporting plate —14—, and the point of contact between eccentric —12— and lever —3— now serves as a point of rotation or fulcrum for the lever during the final period of the braking operation in which the exertion of power properly so-called takes place it being understood that the transverse movement of the shaft 10 is permitted by the movement of the yoke 7. Hence the ratio of transmission of brake pressure is determined by the amount of pressure produced by the actual or momentary position of the eccentric —12— upon the square face of the shaft —10—.

If the power of the brake piston declines then in the first place the lever —3— will be turned back round the point of contact with the eccentric —12— and the pressure of the brake block against the tires of the wheels will decrease; then, with the brake blocks still bearing upon them, the lever —3— will be swung to the left around the bolt —4—. In this way the contact between the lever —3— and the eccentric —12— is removed, and the eccentric 12 is returned to its normally lifted position as shown in Figure 2, by the stop wedge —8— in the yoke —7— bearing against the wedge surface of the wedge-shaped notch in the shaft 10, such stop wedge 8 being moved into engagement with the said wedge shaped surface of the wedge-shaped notch in the shaft —10— and the shaft turned back into its initial position thereby upon the return movement of the lever 3 about the bolt 4. After this has occurred the shaft —10— is held against movement by the wedge 8 in the yoke —7— and the yoke 7 is held against further movement to the left by the shaft 10. From this period, consequently, the bolt —6— forms the fulcrum or point of rotation for the further displacement of the lever —3— up to the termination of the releasing movement when the brake blocks are removed from the wheel tire and assume the position of release. The return transverse movement of the shaft 10 for moving the eccentric 12 from the supporting plate 14 is effected during the re-engagement of the stop wedge 8 with the wedge surface of the wedge surface of the wedge-shaped notch in the shaft 10 when the brake is released or "off" being pulled by the spring —9— to the left in its bearings —13—. The eccentric may, therefore, be readily displaced upon the square face of the shaft —10— and can, consequently, immediately adopt the position corresponding to the actual load on the car. The rod —15— leading to the hand brake remains stationary at each operation of the brake by means of the brake piston, as the bolt —16— is thereby pushed into the slot in this rod. If the braking be effected by hand then, on the contrary, the bolt —2— will be moved in the slot of the rod —1— leading to the brake cylinder which rod —1— in this case remains stationary.

In Figures 4 to 6 which show another constructional form of the parts are represented in the position in which the brake is applied or "on." It differs from that hereinbefore described solely by the fact that the spring —9— is not connected to the yoke —7— but to the brake lever directly between the bolts —6— and —4—. The method of operation of this arrangement is the same as that which has first been described. The lever —3— will, provided there is sufficient initial tension in the spring —9—, first of all turn round the bolt —6— and then after application of the brake blocks to the wheels it will swing to the right round the bolt —4— whilst stretching the spring —9—. The yoke —7— with the stop block —8— will then recede to the right and the shaft —10— will turn under the influence of the weight of the longitudinally movable eccentric mounted upon it so that it will take up a position against the lever —3— and will thus form its fulcrum.

In Figures 7 to 9 there is shown a third constructional form with the brake released or "off"; it differs from the two constructional forms hereinbefore described in that the eccentric —12— begins to move or lower itself out of the "off" position immediately upon the commencement of the movement of the brake lever —3—. This is due to the fact that the movement of the shaft —10— through the brake lever —3— is not effected from the pin —6—, which itself does not begin to move till the brake blocks already bear against the wheels, but from a point of the brake lying closer to the rods —1— and —15— such point therefore beginning to move simultaneously with the operation of the brake and after the application of the brake blocks the eccentric moves in the same direction, but with greater speed, thus reducing the distance the brake lever has to travel before it comes into contact with the eccentric. The connection between the brake lever —3— and the shaft —10— is, in this case, preferably effected by means of the crank —18— attached to the shaft 10 and a link —19— pivotally attached to the brake lever —3—. The link —19— is slotted to receive the crank pin and to permit the brake lever —3— to move after the placing in operative position of the eccentric —12— under the influence of the brake plunger power, the eccentric 12 moving into position at the initial operation of the lever 3, the link 19 releasing the crank 18 permitting the shaft 10 to be rotated by the weight of the eccentric. In this constructional form the bolt —6— is guided in a slot in the stationary guide plate —20—, or in any other suitable manner, and is, by means of the strong spring —17— and weaker spring —9— (which in order to demonstrate another possibility, is here shown in direct connection with the brake pressure rod —5—) engaging with the brake lever —3—, pressed against the left end of the slot in the plate —20— as long as the brake blocks are not applied to or do not bear against the wheels; after application of the brake blocks the bolt —6— is pushed to the left. In all other respects the method of operation of this constructional form is the same as that of the two forms hereinbefore described.

In the fourth constructional form, shown in Figures 10 to 12, with the brake in the "on" position only one spring —9— is so arranged that it acts at the same time as a spring for the withdrawal of the rod. The spring —9— engages with the arm of the brake lever —3— located between the fulcrum —6— and the point of attachment of the brake traction rod —1—. In all other respects there is no difference at all in the type of construction nor in the method of operation in comparison with the constructional form hereinbefore described, with reference to Figures 7, 8 and 9.

In Figures 13 and 14 there are shown by way of example two constructional forms of the rod, by means of which the brake blocks are caused to return readily to their initial position upon the release of the brake. According to the constructional forms already described the connection and disconnection of the eccentric is always effected by its rotary movement, teeth provided if necessary upon the eccentric disc, or the inequalities occurring in the course of work in the originally smooth disc, serving to prevent the disc being turned back upon the release of the brake, so that the brake blocks cannot lift off the wheel tires and the brake rod become jammed. The constructional forms shown in Figures 13 and 14 allow of the eccentric being lifted off upon the release of the brake without this latter having to turn.

In the constructional form according to Figure 13, in order to again show a type differing from the constructional forms hereinbefore described, the eccentric —12— is adapted to swing around a bolt —21— and the ratio of transmission and the position of the point —s— on the brake lever —3— is determined for the period of the maximum exertion of power, i. e., after application of the brake blocks it is constant. The brake lever 3 is guided in its movement when moving about the bolt 4 by the bolt 6' working in a slot 6² in a plate 28 on which is pivotally mounted a lever 29 connected at one end to the hand operated rod 15 and at the other end to a link 30 attached to the brake lever. The movement of the eccentric is in this case effected through the brake pressure rod —5— by means of a link —5'— and of a spring —5''— attached to the said link and the eccentric —12—. The eccentric itself is so formed that, when the brake blocks are not applied to the wheels, it is always at a slight distance from the bearing point —s—. In this construction the brake lever 3 is first moved about the bolt 6' when the braking apparatus is operated, until the brake blocks have been moved into contact with the vehicle wheels through the brake pressure rod 5. At the same time the eccentric is moved into contact with the point *s* of the brake lever and maintained in contact through the link connection 5' and spring 5" connected with the brake pressure rod 5. After such application of the brake blocks to the wheels, the brake pressure rod —5— comes to a standstill, and beginning from this period the eccentric turns no further. The brake pressure lever —3— then bears with the bearing point —s— upon the stationary eccentric and the braking effort is completed. Upon releasing the brake, the eccentric is moved from the lever as upon release of the brake rod —1— the brake lever —3— will be caused first to rotate about the point of connection with the brake pressure rod —5— and as a consequence the bearing point —s— will at once be moved away from the eccentric —12— which thus becomes free before its rotation takes place which will not be effected until the brake lever pivots about the point 6'.

Figure 14 shows a modification, wherein the operation of the eccentric —12— takes place from off a point of the brake lever which, as in all the constructional forms according to Figures 1 to 12, the eccentric maintains a continual rotation up to the moment it becomes operative. In order to secure a positive lifting off in this case of the eccentric upon the release of the brake from the brake lever, care must be taken that the brake lever —3— can move back further towards its initial position even should a release of the eccentric not take place at once. If the brake lever can do this, even when the eccentric does not turn, then both parts move apart from each other and, consequently, contact between the two must be caused to cease. In the present case this is effected for the reason that, between the brake lever —3— and the eccentric —12—, there is provided a flexible connection —22— which not only permits the brake to move further to the right, after bringing the eccentric into play in order to secure the necessary brake pressure, but also renders it possible for the brake lever to move further towards its (left) initial position should a momentary jamming of the eccentric take place when the brake is released. Such a flexible connection can, as shown in Figure 14, be obtained in a known and simple manner by the aid of a spring.

In the construction shown in Figure 14, the brake lever 3 is first operated by the pressure applied through the rod 1 about the bolt 6' arranged in a slot 6² in the plate 28 until the brakes are in contact with the wheels of the vehicle, whereupon the lever next moves about the bolt 4 and finally the brake lever 3 operates about the point *s* against the eccentric 12 which is moved into position by the brake lever operating through the spring controlled link connection 31, lever 32 and link 33.

A positive release of any parts that may be jammed can also be effected for the reason that one of the bolt holes assisting in the operation of the eccentric —12— to be placed in gear is formed as a long hole, whereby a further swinging back of the lever —3—, and thus its lifting off from the eccentric —12— is rendered certain in each case. In the present case only one spring (22) acting in one direction is necessary.

Attention is called to the fact that while all the constructional forms described possess the traction rods —1— and —15— for the application of the brake power and the pressure rods —5— for transmitting the power further to the brake blocks, any other type of power transmission can equally well be used. The eccentric can be formed as a full or solid eccentric of about 300 degrees. The brake lever and allied mechanism constituting the invention can be used with any of the usual types of brake rods.

What we claim and desire to secure by Letters Patent of the United States is:—

1. Braking apparatus comprising a brake lever, and a fulcrum device which is movable into and out of contact with the lever at a point intermediate of its ends.

2. Braking apparatus comprising a brake lever, a fulcrum device which is movable into and out of contact with the lever at a point intermediate of its ends, and a supporting member for the fulcrum device.

3. Braking apparatus comprising a brake lever, a fulcrum device which is movable into and out of contact with the lever at a point intermediate of its ends, means for moving the fulcrum device lengthwise of the lever, and a supporting member for the device.

4. Braking apparatus comprising a spring controlled brake lever, and a rotatable eccentric which is movable into and out of contact with the lever at a point intermediate of its ends and operates as a fulcrum therefor.

5. Braking apparatus comprising a spring controlled brake lever, and a rotatable eccentric which is movable into and out of contact with the lever at a point intermediate of its ends and operates as a fulcrum therefor, and is movable transversely of its axis of rotation.

6. Braking apparatus comprising a spring controlled brake lever, and a rotatable eccentric which is movable into and out of contact with the lever at a point intermediate of its ends and operates as a fulcrum therefor, and is longitudinally movable relatively to its axis of rotation.

7. Braking apparatus comprising a spring controlled brake lever, and a rotatable eccentric which is movable into and out of contact with lever at a point intermediate of its ends and operates as a fulcrum therefor, and is longitudinally and transversely movable relatively to its axis of rotation.

8. Braking apparatus comprising a pivotally mounted and spring controlled brake lever movable about and transversely of its pivotal centre, and a rotatable eccentric which is movable into and out of contact with the brake lever and operates as a fulcrum therefor during the transverse movement of the lever.

9. Braking apparatus comprising a pivotally mounted and spring controlled brake lever movable about and transversely of its pivotal centre, and a rotatable eccentric which is movable into and out of contact with the lever, and is movable transversely of its axis of rotation, and acts as a fulcrum for the lever when the latter is moved transversely of its pivotal centre.

10. Braking apparatus comprising a pivotally mounted spring controlled brake lever, movable about and transversely of its pivotal centre, and a rotatable eccentric which is adjustable lengthwise of its axis and is movable into and out of contact with the lever, and acts as a fulcrum therefor when the lever is moved transversely of the pivotal centre.

11. Braking apparatus comprising a spring controlled and pivotally mounted braking lever movable about and transversely of its pivotal centre and a rotatable eccentric which is adjustable lengthwise of and transversely movable relatively to its axis of rotation.

12. Braking apparatus comprising a spring controlled brake lever rotatably mounted on a transversely movable bolt, an eccentric movable into contact with the lever at a point intermediate of its ends, and means connected with the lever for normally holding the eccentric out of contact therewith.

13. Braking apparatus comprising a spring controlled brake lever rotatably mounted on a transversely movable bolt, an eccentric movable into and out of contact with the lever at a point intermediate of its ends, and means connected with the lever and the eccentric for regulating the operation of the latter.

14. Braking apparatus comprising a brake lever mounted on a transversely movable bolt, a brake piston rod connected to one end of the lever, a brake pressure rod connected to the other end of the lever, a spring connected to the lever and pulling it in an opposite direction to that exerted by the brake piston rod, a rotatable eccentric, a shaft on which the eccentric is mounted formed with a wedge shaped surface, and a stirrup attached to the lever and provided with a wedge-shaped stop block engageable with the wedge-shaped surface on the shaft.

15. Braking apparatus comprising a brake lever mounted on a transversely movable bolt, a brake piston rod connected to one end of the lever, a brake pressure rod connected to the other end of the lever, a spring connected to the lever and pulling it in an opposite direction to that exerted by the brake piston rod, a transversely movable shaft formed with a wedge-shaped surface, bearings for supporting the transversely movable shaft, a rotatable eccentric mounted on the shaft, a supporting plate for the eccentric when it is moved transversely, and a stirrup attached to the lever and provided with a wedge-shaped stop block engageable with the wedge-shaped surface on the shaft.

16. Braking apparatus comprising a brake lever mounted on a transversely movable bolt, a brake piston rod connected to one end of the lever, a brake pressure rod connected to the other end of the lever, a spring connected to the lever and pulling it in an opposite direction to that exerted by the brake piston rod, a transversely movable shaft formed with a square portion and a wedge-shaped surface, bearings for supporting the shaft, a rotatable eccentric mounted on the square portion of the shaft, means for moving the eccentric lengthwise of the shaft, and a stirrup attached to the lever and provided with a wedge-shaped stop-block engageable with the wedge-shaped surface on the shaft.

17. Braking apparatus comprising a brake lever mounted on a transversely movable bolt, a brake piston rod connected to one end of the lever, a brake pressure rod connected to the other end of the lever, a spring connected to the lever and pulling it in an opposite direction to that exerted by the brake piston rod, a rotatable and transversely movable shaft formed with a square portion and a wedge-shaped surface, bearings for supporting the transversely movable shaft, an eccentric mounted on the square portion of the shaft, a supporting plate for the eccentric when it is moved transversely, a thrust rod connected with the eccentric, a vehicle frame, means connecting the frame with the thrust rod, and a stirrup attached to the transversely movable bolt of the brake and provided with a wedge-shaped stop-block engageable with the wedge-shaped surface on the shaft.

Ing. ALFRED SCHEUER.
HUGO SCHEUER.